United States Patent
Guo et al.

(10) Patent No.: US 12,316,188 B2
(45) Date of Patent: May 27, 2025

(54) MULTI-MOVER DIRECT DRIVE TRANSMISSION SYSTEM

(71) Applicant: AAC Technologies (Nanjing) Co., Ltd., Nanjing (CN)

(72) Inventors: Shun Guo, Nanjing (CN); Weiling Shi, Nanjing (CN); Lin Qian, Nanjing (CN); Xueyuan Zhu, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 240 days.

(21) Appl. No.: 18/325,953

(22) Filed: May 30, 2023

(65) Prior Publication Data

US 2024/0178736 A1    May 30, 2024

Related U.S. Application Data

(63) Continuation of application No. PCT/CN2022/144415, filed on Dec. 31, 2022.

(30) Foreign Application Priority Data

Nov. 29, 2022 (CN) .......................... 202223200823.8

(51) Int. Cl.
 *H02K 41/03* (2006.01)
 *H02K 11/215* (2016.01)
 *H02K 11/22* (2016.01)

(52) U.S. Cl.
 CPC ......... *H02K 41/031* (2013.01); *H02K 11/215* (2016.01); *H02K 11/22* (2016.01)

(58) Field of Classification Search
 CPC ..... H02K 11/22; H02K 11/215; H02K 41/031
 USPC ...................................................... 310/12.18
 See application file for complete search history.

(56) References Cited

U.S. PATENT DOCUMENTS

| | | | |
|---|---|---|---|
| 11,831,182 B1* | 11/2023 | Huang | H02J 50/10 |
| 2010/0289345 A1* | 11/2010 | Sakai | H02K 41/031 |
| | | | 310/12.31 |
| 2010/0290871 A1* | 11/2010 | Hanamura | H02K 11/21 |
| | | | 414/225.01 |
| 2011/0052348 A1* | 3/2011 | Hanamura | H02K 11/0141 |
| | | | 310/12.13 |
| 2013/0187573 A1* | 7/2013 | Inoue | H02P 25/06 |
| | | | 318/135 |
| 2019/0193942 A1* | 6/2019 | Hayashi | G01D 5/2451 |
| 2020/0161998 A1* | 5/2020 | Kim | H02K 11/215 |

(Continued)

*Primary Examiner* — Rashad H Johnson
(74) *Attorney, Agent, or Firm* — Wiersch Law Group

(57) ABSTRACT

The multi-mover direct drive transmission system includes multiple stator units, a guide rail, multiple mover units, and a controller. Each of the multiple stator units includes a stator, a winding, a photoelectric switch, a reading head, and a driver. Each of the multiple mover units includes a mover, and a magnetic steel, two stoppers, and a grating ruler. Each of the two stoppers are configured to pass and block the photoelectric switch. The grating ruler is arranged opposite to the reading head, and the reading head is configured to read information from the grating ruler in real-time. The controller is configured to obtain the reading signal and two zero signals from the photoelectric switch by the driver. Compared with the conventional art, the multi-mover direct drive transmission system of the present invention has simple structure, high positioning accuracy, and easy to use.

10 Claims, 4 Drawing Sheets

(56) References Cited

U.S. PATENT DOCUMENTS

| | | | |
|---|---|---|---|
| 2020/0166389 A1* | 5/2020 | Huang | G01D 18/008 |
| 2021/0249943 A1* | 8/2021 | Yamamoto | B65G 43/08 |
| 2021/0253351 A1* | 8/2021 | Huang | G05B 19/042 |
| 2022/0060125 A1* | 2/2022 | Gao | H02N 2/062 |
| 2022/0388786 A1* | 12/2022 | Fujii | H01L 21/67709 |
| 2023/0068768 A1* | 3/2023 | Huang | G05B 19/19 |
| 2023/0079622 A1* | 3/2023 | Choumach | H02K 5/00 310/12.01 |
| 2023/0275499 A1* | 8/2023 | Shen | H02K 41/031 |
| 2024/0171037 A1* | 5/2024 | Shi | H02K 1/12 |
| 2024/0178727 A1* | 5/2024 | Shi | H02K 11/21 |
| 2024/0178780 A1* | 5/2024 | Shi | H02K 41/031 |
| 2024/0195338 A1* | 6/2024 | Guo | H02P 25/064 |
| 2024/0213900 A1* | 6/2024 | Qian | H02P 23/14 |
| 2024/0213901 A1* | 6/2024 | Chen | H02P 25/06 |
| 2024/0230375 A1* | 7/2024 | Huang | H02P 29/027 |
| 2024/0255368 A1* | 8/2024 | Gardner | G01L 5/0028 |
| 2025/0007377 A1* | 1/2025 | Nakamura | H02K 11/21 |
| 2025/0083906 A1* | 3/2025 | Chi | H02K 41/031 |

\* cited by examiner

MULTI-MOVER DIRECT DRIVE TRANSMISSION SYSTEM

TECHNICAL FIELD

The present invention relates to the technical field of electroacoustic transducing, in particular to a multi-mover direct drive transmission system applied to a portable electronic product.

BACKGROUND

With the increasing importance of the application of assembly lines in production, a multi-mover direct drive transmission system has become an important production equipment on the assembly line.

The multi-mover direct drive transmission system in the conventional art includes multiple segments, multiple movers installed on a stator, and multiple drivers. The stator includes a coil winding, the mover includes a magnet, which is spaced and arranged opposite to the coil winding. The coil winding drives the magnet to cause the mover to move, and the multiple drivers are electrically connected to the coil winding to control the coil winding, to drive the magnetic steel. In terms of feedback control, the multi-mover direct drive transmission system in the conventional art generally adopts an absolute feedback scheme, in which there are generally two types of a feedback unit, one type is an absolute optical grating ruler or an absolute magnetic grating ruler, the other type is a linear Hall device and a sensing grating ruler.

However, the feedback control scheme of the absolute grating ruler or the absolute magnetic grating ruler in the conventional art has high positioning accuracy but high cost. The feedback control scheme of the linear Hall device and the sensing grating ruler has low cost, but lower position detection accuracy. Therefore, how to ensure the high positioning accuracy of the feedback control scheme while making the structure of the feedback control scheme simple, low-cost, and easy to use is a technical problem that needs to be solved.

Therefore, it is necessary to provide a new multi-mover direct drive transmission system to solve the above technical problems.

SUMMARY

An objective of the present invention is to overcome the above technical problems and provide a multi-mover direct drive transmission system with simple structure, high positioning accuracy, and is easy to use.

In order to achieve the above objective, a multi-mover direct drive transmission system is provided according to the embodiments of the present invention, where the multi-mover direct drive transmission system includes multiple stator units connected in sequence, a guide rail attached to the multiple stator units, multiple mover units configured to form a sliding connection with the guide rail and form a drive force with the multiple stator units, and a controller configured to control the multiple mover units to move. Each of the multiple stator units includes a stator, a winding fixed to the stator, a photoelectric switch, a reading head, and a driver electrically connected to the controller, the guide rail is fixed to the stator, and the driver is electrically connected to the winding, the photoelectric switch, and the reading head, respectively. Each of the multiple mover units includes a mover, and a magnet fixed to the mover, a stopper fixed to the mover, and a grating ruler extending along a moving direction of each of the multiple mover units. The mover forms a sliding connection with the guide rail, the magnet is spaced from and arranged opposite to the winding, and the winding is configured to drive the magnet to enable the each of the multiple mover units along the guide rail. The stopper is arranged opposite to the photoelectric switch, there are two stoppers, and positions of the two stoppers in the mover correspond to two opposite ends of the grating ruler along the moving direction of each of the multiple mover units. Each of the two stoppers are configured to pass and block the photoelectric switch, to enable the photoelectric switch to generate a zero signal and send the zero signal to the driver. The grating ruler is arranged opposite to the reading head, and the reading head is configured to read information from the grating ruler in real-time and generate a reading signal according to the information and send the reading signal to the driver. The controller is configured to obtain the reading signal and the zero signal from the photoelectric switch by the driver, to locate positions of the multiple mover units in real-time.

As an improvement, the two stoppers includes a first stopper and a second stopper, the first stopper is directly arranged opposite to a starting position of the grating ruler along the moving direction of each of the multiple mover units, to enable the photoelectric switch to generate a first zero signal in response to the first stopper passing through and blocking the photoelectric switch; the second stopper is directly arranged opposite to a ending position of the grating ruler along the moving direction of each of the multiple mover units, to enable the photoelectric switch to generate a second zero signal in response to the second stopper passing through and blocking the photoelectric switch.

As an improvement, the starting position and the ending position are arranged at the two opposite ends of the grating ruler along the moving direction of each of the multiple mover units, respectively.

As an improvement, the grating ruler is an optical grating ruler or a magnetic grating ruler.

In some embodiments, there are two guide rails spaced from each other and arranged parallel to an extending direction of the multiple stator units, the two guide rails are located on the same horizontal level, and the winding, the photoelectric switch, the reading head, the magnetic steel, the two stoppers, and the grating ruler are all located between the two guide rails.

As an improvement, the photoelectric switch and the reading head are both located on a same side of the winding, and the two stoppers and the grating ruler are both located on a same side of the magnetic steel.

As an improvement, the photoelectric switch is spaced between the winding and the reading head, and the two stoppers is spaced between the magnet and the grating ruler.

As an improvement, the stator is made of a conductive magnet, and the mover is made of a conductive magnet.

As an improvement, there are multiple magnetic steels, and the multiple magnets are sequentially stacked and arranged along the moving direction of each of the multiple mover units; there are multiple windings, and the multiple windings are sequentially stacked and arranged along the moving direction of each of the multiple mover units.

As an improvement, the driver is electrically connected to the winding, the photoelectric switch, and the reading head by cables.

Compared with the conventional art, in the multi-mover direct drive transmission system of the present invention, the photoelectric switch and the reading head are arranged in each of the multiple stator units. Two stoppers and the grating ruler extending along the moving direction of each of the multiple mover units are arranged in each of the multiple mover units. The grating ruler is arranged opposite to the reading head, the two stoppers are arranged opposite to the photoelectric switch, and the two stopper are arranged correspond to the opposite ends of the grating ruler, which allows each of the two stoppers to pass through and block the photoelectric switch, causing the photoelectric switch to generate a zero signal and send the zero signal to the driver. The reading head is configured to read information from the grating ruler in real-time, generate a reading signal according to the information, and send the reading signal to the driver. Moreover, the controller is configured to obtain the reading signal and two zero signals by the driver to locate positions of the multiple mover units in real-time. In this way, the grating ruler and the reading head are adopted as an incremental feedback device and serve as a position feedback unit. The two stoppers and the photoelectric switch are adopted to achieve the feedback position effect of the absolute position scheme, thereby ensuring high accuracy in identifying the positions of the multiple movers. In addition, the multi-mover direct drive transmission system of the present invention has simple structure, easy to use, and low cost.

BRIEF DESCRIPTION OF THE DRAWINGS

For more clearly illustrating embodiments of the present invention or the technical solutions in the conventional technology, drawings referred to for describing the embodiments or the conventional technology will be briefly described hereinafter. Apparently, drawings in the following description are only examples of the present invention, and for the person skilled in the art, other drawings may be acquired based on the provided drawings without any creative efforts.

DETAILED DESCRIPTION

The technical solutions according to the embodiments of the present invention will be described clearly and completely as follows in conjunction with the drawings in the embodiments of the present invention. It is apparent that the described embodiments are only a part of the embodiments according to the present invention, rather than all the embodiments. Based on the embodiments of the present invention, all other embodiments obtained without creative efforts by those of ordinary skill in the art shall fall within the protection scope of the present invention.

A multi-mover direct drive transmission system 100 is provided according to the embodiments of the present invention.

Figure 1:
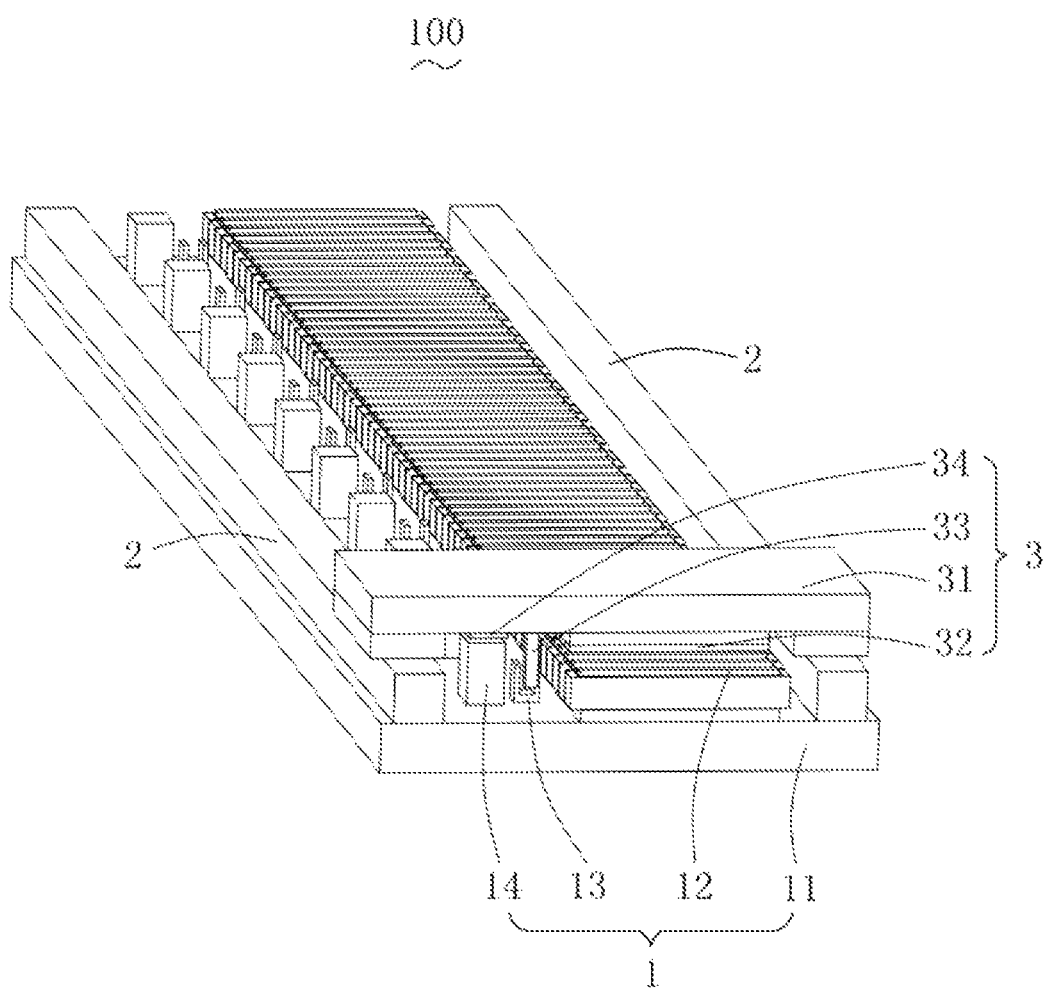
FIG. 1 is a schematic three-dimensional structural view of a multi-mover direct drive transmission system provided according to an embodiment of the present invention.
Figure 2:
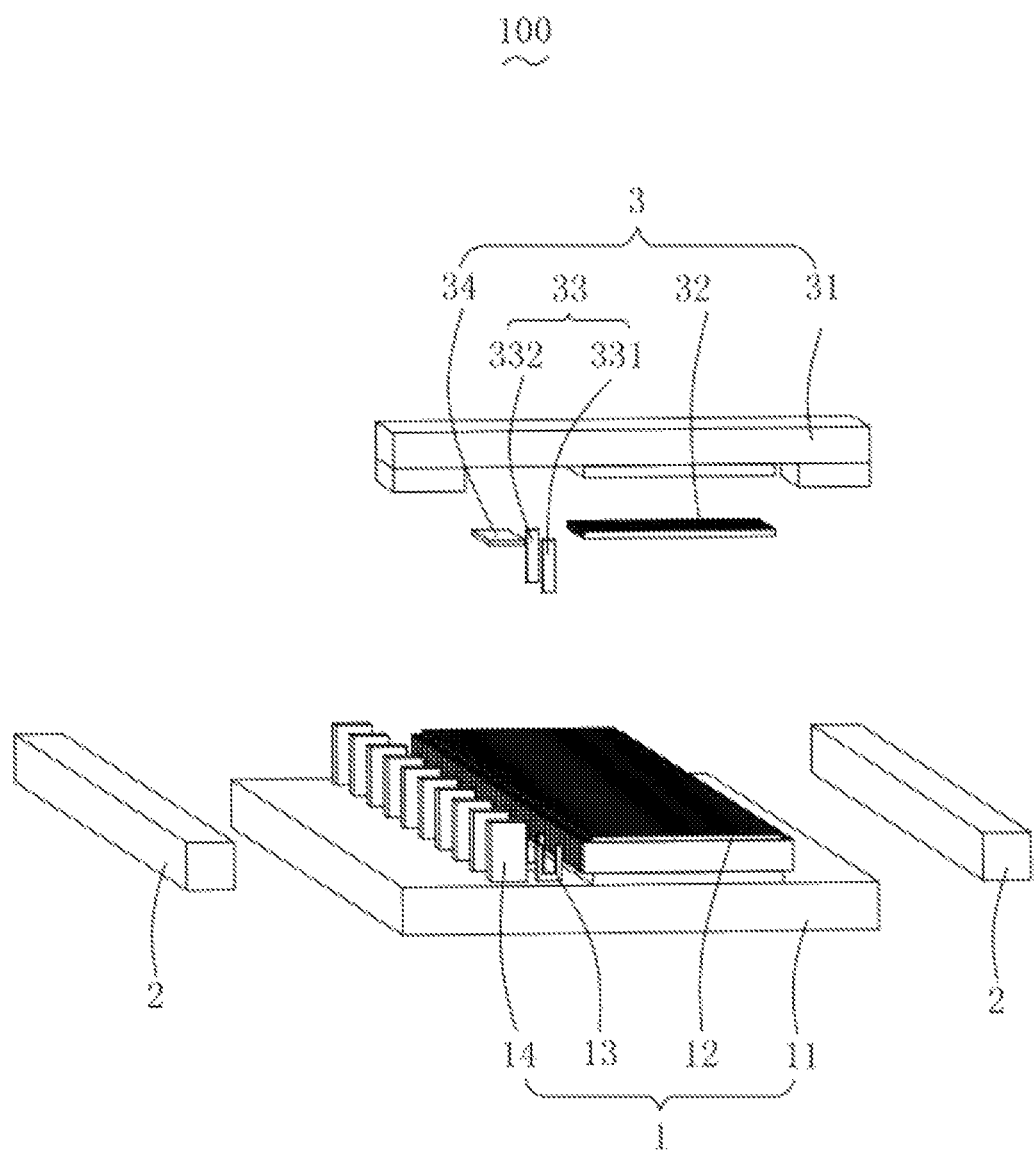
FIG. 2 is a partial three-dimensional explosive view of a multi-mover direct drive transmission system provided according to an embodiment of the present invention.
Figure 3:
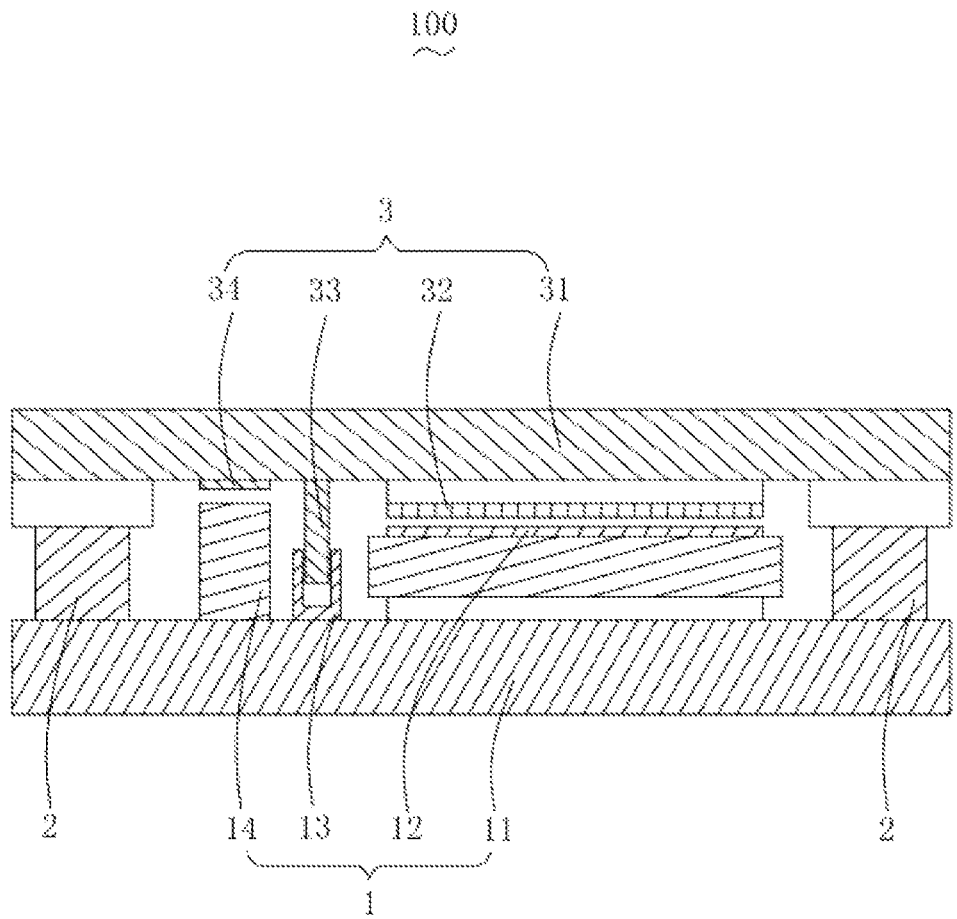
FIG. 3 is a schematic structural view of a multi-mover direct drive transmission system provided according to an embodiment of the present invention from another perspective.
Figure 4:
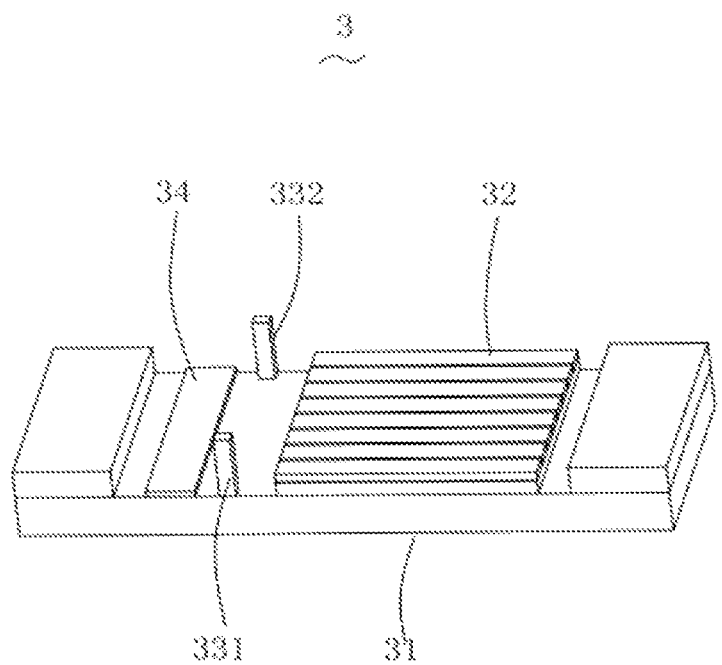
FIG. 4 is a schematic three-dimensional structural view of a mover unit of a multi-mover direct drive transmission system provided according to an embodiment of the present invention.
Figure 5:
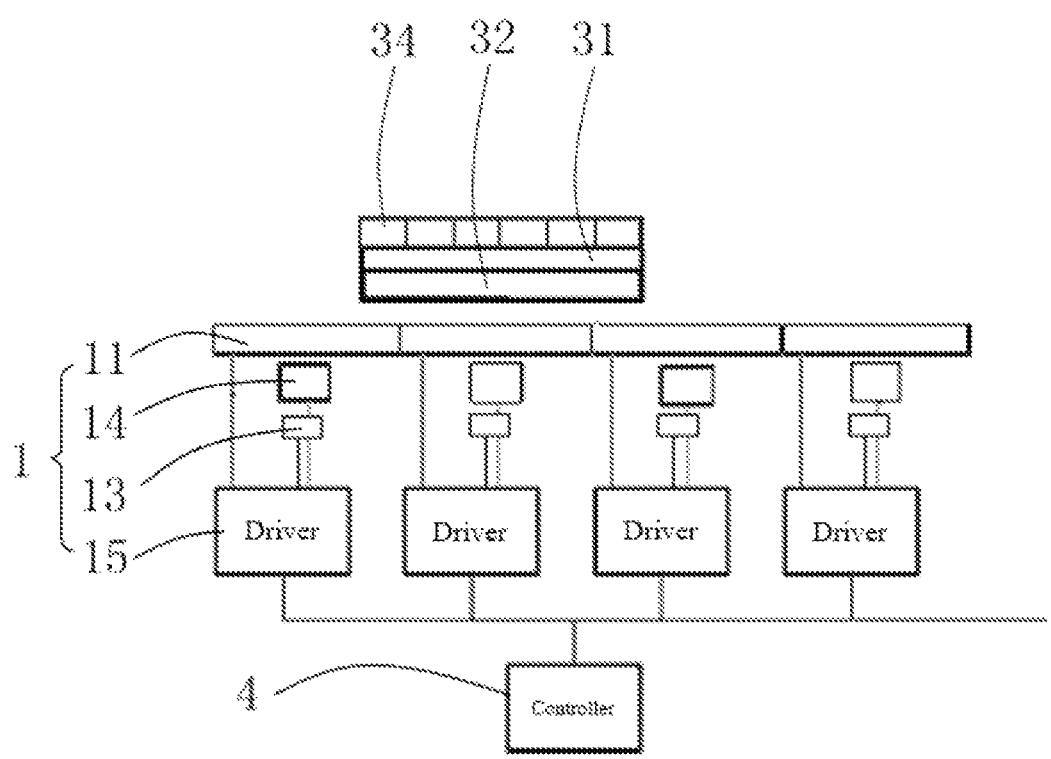
FIG. 5 is a schematic structural view of application relationship of a multi-mover direct drive transmission system provided according to an embodiment of the present invention.

Reference is made to FIG. 1 to FIG. 5. Specifically, the multi-mover direct drive transmission system 100 includes multiple stator units 1, a guide rail 2, multiple mover units 3, and a controller 4.

The multiple stator units 1 are sequentially connected integratedly.

Each of the multiple stator units 1 includes a stator 11, a winding 12, a photoelectric switch 13, a reading head 14, and a driver 15.

The stator 11 is made of a conductive magnet.

The winding 12 is fixed to the stator 11. The winding 12 is located on a side of the stator 11 close to the mover unit 3, that is, the winding 12 and the guide rail 2 are located on the same side of the stator 11.

In this embodiment, there are multiple windings 12 arranged in sequence along the moving direction of each of the multiple mover units 3, which is advantageous for assembly and manufacturing while saving costs.

The photoelectric switch 13 is fixed to the stator 11. The photoelectric switch 13 is spaced between the winding 12 and the reading head 14, The reading head 14 is fixed to the stator 11.

The photoelectric switch 13 and the reading head 14 are both located on the same side of the winding 12.

The driver 15 is electrically connected to the controller 4. In this embodiment, the driver 15 is configured to perform data communication with the controller 4.

The driver 15 is electrically connected to the winding 12, the photoelectric switch 13, and the reading head 14, respectively. In this embodiment, the driver 15 is electrically connected to the winding 12, the photoelectric switch 13, and the reading head 14 by cables, which can save costs compared to PCB board wiring.

The guide rail 2 is fixed to the stator unit 1. In this embodiment, the guide rail 2 is attached to the stator unit 1. Specifically, the guide rail 2 is attached to the stator 11.

In this embodiment, there are two guide rails 2 spaced from each other and arranged parallel to an extending direction of the multiple stator units 1, the two guide rails 2 are located on the same horizontal level, which is beneficial for the smooth movement of the mover unit 3. The mover unit 3 forms a sliding connection with the guide rail 2.

There are multiple mover unit 3, which are beneficial for improving the efficiency of the multi-mover direct drive transmission system 100. Of course, not limited to this, it is possible to arrange only one mover unit 3.

Specifically, each of the multiple mover units 3 includes a mover 31, a magnet 32, a stopper 33, and a grating ruler 34.

The mover 31 forms a sliding connection with the guide rail 2.

The mover 31 is made of a conductive magnet.

The magnet 32 is fixed to the mover 31. The magnet 32 is spaced from and arranged directly opposite to the winding 12.

The multiple mover units 3 and the multiple stator units 1 form a drive force with each other. Specifically, the winding 12 is configured to drive the magnet 32 to enable the multiple mover units 3 along the guide rail 2.

In this embodiment, there are multiple magnets 32 sequentially stacked and arranged along the moving direction of the multiple mover units 3, which is advantageous for assembly and manufacturing, while saving costs.

The stopper 33 is fixed to the mover 31. The stopper 33 and the grating ruler 34 are both located on the same side of the magnet 32. Specifically, the stopper 33 is spaced between the magnet 32 and the grating ruler 34.

The stopper 33 is arranged directly opposite to the photoelectric switch 13. The stopper 33 is configured to trigger the photoelectric switch 13 and generate a zero signal, which can meet the requirements of zero signal recognition for the movement of the multiple mover units 3 in different directions. That is to say, the stopper 33 is configured to trigger the photoelectric switch 13 to identify the zero signal during the mover unit 3 moving forward and backward.

There are two stoppers 33, and positions of the two stoppers 33 in the mover 31 correspond to the opposite ends of the grating ruler 34 along the moving direction of the mover unit 3. Each of the two stoppers 33 is configured to pass through and block the photoelectric switch 13, to enable the photoelectric switch 13 to generate a zero signal and send the zero signal to the driver 15, which is advantageous for the driver 15 to read the zero signal quickly and accurately in response to the stopper 33 passing through and blocking the photoelectric switch 13, thereby achieving fast and high-precision positioning of the multiple mover unit 3.

In this embodiment, the two stoppers include a first stopper 331 and a second stopper 332, the first stopper 331 is directly arranged opposite to a starting position of the grating ruler 34 along the moving direction of each of the multiple mover units 3, to enable the photoelectric switch 13 to generate a first zero signal in response to the first stopper 331 passing through and blocking the photoelectric switch 13. The second stopper 332 is directly arranged opposite to a ending position of the grating ruler 34 along the moving direction of each of the multiple mover units 3, to enable the photoelectric switch 13 to generate a second zero signal in response to the second stopper 332 passing through and blocking the photoelectric switch 13.

The starting position and the ending position are arranged at two endpoints of the grating ruler 34 along the moving direction of the each of the multiple mover units 3, respectively.

The grating ruler 34 is fixed to the mover 31. The grating ruler 34 extends along the moving direction of the each of the multiple mover units 3.

The winding 12, the photoelectric switch 13, the reading head 14, the magnet 32, the two stoppers 33, and the grating ruler 34 are all located between the two guide rails 2.

The grating ruler 34 is embodied as an incremental grating ruler. Specifically, the grating ruler 34 is an optical grating ruler or a magnetic grating ruler. In this embodiment, the grating ruler 34 is the optical grating ruler.

The grating ruler 34 is arranged directly opposite to the reading head 14. The reading head 14 is configured to read information from the grating ruler 34 in real-time, generate a reading signal according to the information, and send the reading signal to the driver 15. In this way, the grating ruler 34 and the reading head 14 are adopted as an incremental feedback device and serve as a position feedback unit. The two stoppers 33 and the photoelectric switch 13 are adopted to achieve the feedback position effect of the absolute position scheme, thereby ensuring high positioning accuracy. In addition, the structure of the multi-mover direct drive transmission system 100 of the present invention is simple, easy to use, and low cost.

The controller 4 is configured to control the multiple mover units 3 to move. The driver 15 of each of the multiple stator units 1 receives systematic motion control from the same controller 4. Specifically, the controller 4 is configured to obtain the reading signal and two zero signals by the driver 15 to locate positions of the multiple mover units 3 in real-time.

In this embodiment, the working process of the multi-mover direct drive transmission system 100 of the present invention is as follows.

The multi-mover direct drive transmission system 100 starts the system and returns to the starting point. Before operating the system, the system needs to be reset integratedly. After the system is restarted, all the mover units 3 move in a fixed direction, and the reading head 14 reads the information from the grating ruler 34 in real time. In response to the photoelectric switch 13 being blocked by the stopper 33 corresponding to the grating ruler 34 of the mover unit 3, the driver 15 receives a level signal and records a zero signal. In response to two zero signals being identified by the driver 15 and a feedback interval between the two zero signals being a certain set value, the controller 4 determines that the mover unit 3 is restarted. In this way, a feedback position of the reading head 14 of the next stator unit 1 is the accurate position of the mover unit 3.

After that, a global position coordinate system is established based on the position feedback of the mover unit 3. Specifically, based on the zero signal identified by the driver 15, the reading head 14 installed on each of the multiple stator unit 1 will provide real-time feedback on the position information of the corresponding mover unit 3, and transmits the position information during operation to the controller 4 for drive control of the mover unit 3.

It should be pointed out that the controller 4 can use common drive methods and algorithms in the art to perform drive control of the mover unit 3. The specific drive methods and algorithms can be selected based on actual design requirements, which will not be elaborated here.

Therefore, it is concluded from the working process of the multi-mover direct drive transmission system 100 of the present invention that the multi-mover direct drive transmission system 100 has high positioning accuracy, simple structure, easy to use, and low cost.

Compared with the conventional art, in the multi-mover direct drive transmission system of the present invention, the photoelectric switch and the reading head are arranged in each of the multiple stator units. Two stoppers and the grating ruler extending along the moving direction of each of the multiple mover units are arranged in each of the multiple mover units. The grating ruler is arranged opposite to the reading head, the two stoppers are arranged opposite to the photoelectric switch, and the two stopper are arranged correspond to the opposite ends of the grating ruler, which allows each of the two stoppers to pass through and block the photoelectric switch, causing the photoelectric switch to generate a zero signal and send the zero signal to the driver. The reading head is configured to read information from the grating ruler in real-time, generate a reading signal according to the information, and send the reading signal to the driver. Moreover, the controller is configured to obtain the reading signal and two zero signals by the driver to locate positions of the multiple mover units in real-time. In this way, the grating ruler and the reading head are adopted as an incremental feedback device and serve as a position feedback unit. The two stoppers and the photoelectric switch are adopted to achieve the feedback position effect of the absolute position scheme, thereby ensuring high accuracy in identifying the positions of the multiple movers. In addition, the multi-mover direct drive transmission system of the present invention has simple structure, easy to use, and low cost.

The above are only the embodiments of the present invention. It should be pointed out that for those of ordinary skill in the art, improvements may be made without departing from the inventive concept of the present invention, and these improvements shall fall within the scope of protection of the present invention.

The invention claimed is:

1. A multi-mover direct drive transmission system, comprising a plurality of stator units connected in sequence, a guide rail attached to the plurality of stator units, a plurality of mover units configured to form a sliding connection with the guide rail and form a drive force with the plurality of stator units, and a controller configured to control the plurality of mover units to move;

wherein each of the plurality of stator units comprises a stator, a winding fixed to the stator, a photoelectric switch, a reading head, and a driver electrically connected to the controller, the guide rail is fixed to the stator, and the driver is electrically connected to the winding, the photoelectric switch, and the reading head, respectively;

wherein each of the plurality of mover units comprises a mover, and a magnet fixed to the mover, a stopper fixed to the mover, and a grating ruler extending along a moving direction of each of the plurality of mover units; the mover forms a sliding connection with the guide rail, the magnet is spaced from and arranged opposite to the winding, and the winding is configured to drive the magnet to enable the each of the plurality of mover units along the guide rail;

wherein the stopper is arranged opposite to the photoelectric switch, there are two stoppers, and positions of the two stoppers in the mover correspond to two opposite ends of the grating ruler along the moving direction of each of the plurality of mover units; each of the two stoppers are configured to pass and block the photoelectric switch, to enable the photoelectric switch to generate a zero signal and send the zero signal to the driver;

wherein the grating ruler is arranged opposite to the reading head, and the reading head is configured to read information from the grating ruler in real-time and generate a reading signal according to the information and send the reading signal to the driver;

wherein the controller is configured to obtain the reading signal and the zero signal from the photoelectric switch by the driver, to locate positions of the plurality of mover units in real-time.

2. The multi-mover direct drive transmission system according to claim 1, wherein the two stoppers comprises a first stopper and a second stopper, the first stopper is directly arranged opposite to a starting position of the grating ruler along the moving direction of each of the plurality of mover units, to enable the photoelectric switch to generate a first zero signal in response to the first stopper passing through and blocking the photoelectric switch; the second stopper is directly arranged opposite to a ending position of the grating ruler along the moving direction of each of the plurality of mover units, to enable the photoelectric switch to generate a second zero signal in response to the second stopper passing through and blocking the photoelectric switch.

3. The multi-mover direct drive transmission system according to claim 2, wherein the starting position and the ending position are arranged at the two opposite ends of the grating ruler along the moving direction of each of the plurality of mover units, respectively.

4. The multi-mover direct drive transmission system according to claim 1, wherein the grating ruler is an optical grating ruler or a magnetic grating ruler.

5. The multi-mover direct drive transmission system according to claim 1, wherein there are two guide rails spaced from each other and arranged parallel to an extending direction of the plurality of stator units, the two guide rails are located on the same horizontal level, and the winding, the photoelectric switch, the reading head, the magnetic steel, the two stoppers, and the grating ruler are all located between the two guide rails.

6. The multi-mover direct drive transmission system according to claim 1, wherein the photoelectric switch and the reading head are both located on a same side of the winding, and the two stoppers and the grating ruler are both located on a same side of the magnetic steel.

7. The multi-mover direct drive transmission system according to claim 6, wherein the photoelectric switch is spaced between the winding and the reading head, and the two stoppers is spaced between the magnet and the grating ruler.

8. The multi-mover direct drive transmission system according to claim 1, wherein the stator is made of a conductive magnet, and the mover is made of a conductive magnet.

9. The multi-mover direct drive transmission system according to claim 1, wherein there are a plurality of magnetic steels, and the plurality of magnets are sequentially stacked and arranged along the moving direction of each of the plurality of mover units; there are a plurality of windings, and the plurality of windings are sequentially stacked and arranged along the moving direction of each of the plurality of mover units.

10. The multi-mover direct drive transmission system according to claim 1, wherein the driver is electrically connected to the winding, the photoelectric switch, and the reading head by cables.

* * * * *